(12) United States Patent
Nishikawa et al.

(10) Patent No.: US 8,793,695 B2
(45) Date of Patent: Jul. 29, 2014

(54) INFORMATION PROCESSING DEVICE AND INFORMATION PROCESSING METHOD

(75) Inventors: Naohiro Nishikawa, Tokyo (JP); Seiji Murata, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 155 days.

(21) Appl. No.: 13/142,156

(22) PCT Filed: Sep. 29, 2009

(86) PCT No.: PCT/JP2009/004995
§ 371 (c)(1),
(2), (4) Date: Aug. 26, 2011

(87) PCT Pub. No.: WO2010/082244
PCT Pub. Date: Jul. 22, 2010

(65) Prior Publication Data
US 2011/0302587 A1    Dec. 8, 2011

(30) Foreign Application Priority Data

Jan. 16, 2009    (JP) ................. 2009-008162

(51) Int. Cl.
*G06F 9/46*    (2006.01)
(52) U.S. Cl.
USPC .......................................... 718/102
(58) Field of Classification Search
CPC .................................................. G06F 9/4881
USPC ............................................................ 718/102
See application file for complete search history.

(56) References Cited

U.S. PATENT DOCUMENTS

| 6,108,683 | A | 8/2000 | Kamada |
| 6,668,269 | B1 | 12/2003 | Kamada |
| 6,675,190 | B1 * | 1/2004 | Schabernack et al. ........ 718/102 |
| 6,981,258 | B1 | 12/2005 | Takakura |
| 8,375,390 | B2 | 2/2013 | Inoue |

(Continued)

FOREIGN PATENT DOCUMENTS

| CN | 101180609 A | 5/2008 |
| DE | 10337294 A1 | 5/2005 |

(Continued)

OTHER PUBLICATIONS

Supplemental European search report for corresponding European Patent Application No. 09838214.6, dated Oct. 9, 2012.

(Continued)

*Primary Examiner* — Emerson Puente
*Assistant Examiner* — Charlie Sun
(74) *Attorney, Agent, or Firm* — Matthew B. Dernier, Esq.; Gibson & Dernier LLP

(57) ABSTRACT

A system-level management unit generates a system processing and makes a processing request to a task allocation unit of a user-level management unit. The task allocation unit schedules the system processing according to a procedure of an introduced user-level scheduling. A processing unit assigned to execute the system processing sends a notification of acceptability of the system processing to a main processing unit, by halts an application task in appropriate timing or when the processing of the current task is completed. When the notification is received within the time limit for execution, the system-level management unit has the processing unit start the system processing.

10 Claims, 12 Drawing Sheets

(56) References Cited

U.S. PATENT DOCUMENTS

| | | | |
|---|---|---|---|
| 2004/0055003 A1* | 3/2004 | Sundaram et al. | 718/108 |
| 2004/0260782 A1* | 12/2004 | Affleck et al. | 709/208 |
| 2005/0268300 A1* | 12/2005 | Lamb et al. | 718/100 |
| 2007/0106990 A1* | 5/2007 | Kissell | 718/102 |
| 2007/0124736 A1* | 5/2007 | Gabor et al. | 718/108 |
| 2008/0120620 A1 | 5/2008 | Lett | |
| 2008/0244584 A1* | 10/2008 | Smith et al. | 718/102 |
| 2009/0031315 A1 | 1/2009 | Inoue | |
| 2009/0300629 A1* | 12/2009 | Navon et al. | 718/102 |
| 2010/0271479 A1* | 10/2010 | Heydlauf | 348/143 |
| 2010/0333097 A1* | 12/2010 | Johnson et al. | 718/102 |
| 2011/0131584 A1* | 6/2011 | Wang et al. | 718/104 |

FOREIGN PATENT DOCUMENTS

| | | |
|---|---|---|
| EP | 1923784 A1 | 5/2008 |
| JP | 08016410 A | 1/1996 |
| JP | 0954699 A | 2/1997 |
| JP | 09054699 A | 2/1997 |
| JP | 2001022601 A | 1/2001 |
| JP | 2001043091 A | 2/2001 |
| JP | 2001117786 A | 4/2001 |
| JP | 2007052511 A | 3/2007 |

OTHER PUBLICATIONS

"Preferential Affinity for Process Scheduling", IBM Technical Disclosure Bulletin, International Business Machines Corp. (Thornwood), vol. 38, No. 2 Feb. 1, 2995.

International Search Report for corresponding PCT application PCT/JP2009/004995, dated Dec. 28, 2009.

International Preliminary Report on Patentability and Written Opinion for corresponding PCT application PCT/JP2009/004995, dated Aug. 16, 2011.

Office action for corresponding JP Application No. 2009-008162, dated Apr. 16, 2013.

Office action for corresponding CN Application No. 200980154610.4, dated Feb. 5, 2013.

Office action for corresponding Chinese Patent Application No. 200980154610.4, dated Oct. 14, 2013.

* cited by examiner

| WORKLOAD | PRIORITY LEVEL ||||  THE MAXIMUM NUMBER OF PROCESSING UNITS |
| --- | --- | --- | --- | --- | --- |
| | PROCESSING UNIT 22a | PROCESSING UNIT 22b | PROCESSING UNIT 22c | PROCESSING UNIT 22d | |
| WORKLOAD P | 1 | 0 | 2 | 2 | 2 |
| WORKLOAD A | 0 | 1 | 0 | 0 | |
| WORKLOAD G | 2 | 2 | 1 | 1 | 3 |
| WORKLOAD M | 0 | 0 | 3 | 3 | |

FIG.10

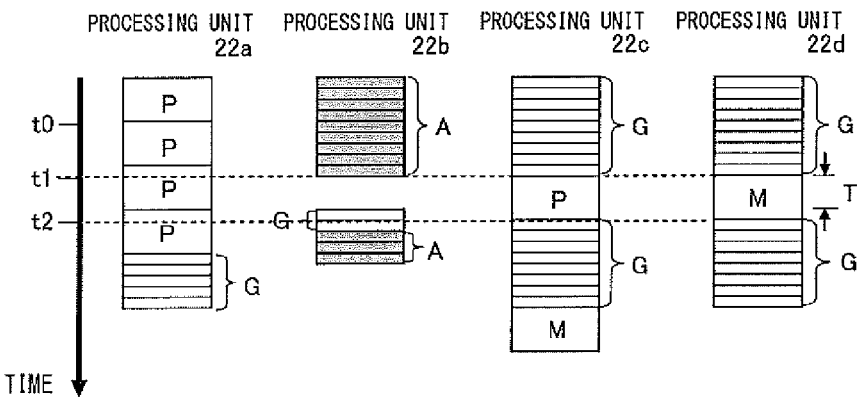

FIG.11

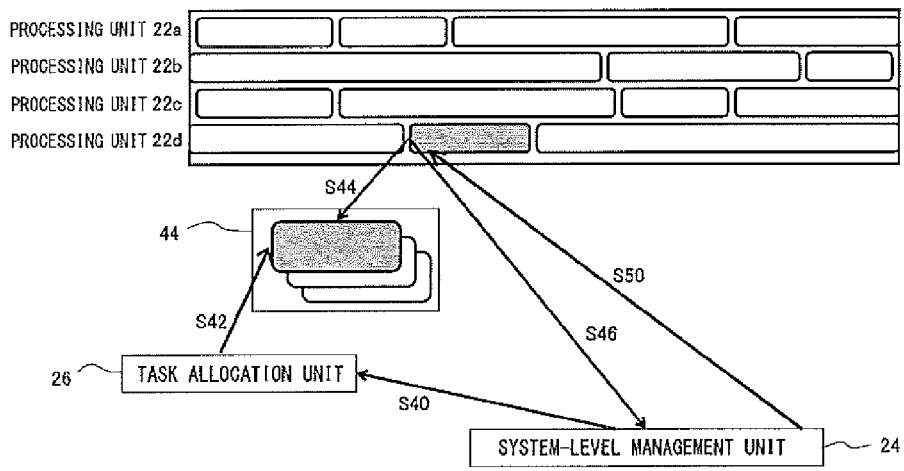

FIG.12

| GROUP | TYPE | RESOURCE ALLOCATION UNIT | USER PARAMETER |
|---|---|---|---|
| SYSTEM SERVICE | AUDIO(NOISE CANCELLER, ECHO CANCELLER) | GROUP | ALLOCATION SUB-PROCESSING UNIT<br>THE MAXIMUM QUOTA |
| BACKGROUND SERVICE | SYSTEM BGM | GROUP | ALLOCATION SUB-PROCESSING UNIT<br>THE MAXIMUM QUOTA |
| UTILITY | MUSIC, AV CHAT | GROUP | PRIORITY LEVEL TABLE<br>THE MAXIMUM QUOTA |
| HIGH-LOAD SERVICE | REMOTE PLAY, RECORDING | PER TYPE | PRIORITY LEVEL TABLE<br>THE MAXIMUM QUOTA |

100

INFORMATION PROCESSING DEVICE AND INFORMATION PROCESSING METHOD

TECHNICAL FIELD

The present invention relates to an information processing technology and, in particular, to a technology for executing computer programs by distributing the processing across a plurality of computational resources.

BACKGROUND ART

The advancing sophistication of software, such as computer games and Web search software, is placing great burden on the hardware. To cope with this situation, it is of course necessary to increase the speed of computation itself, but it is also important to introduce multiple processors and carry out multiple task processing efficiently. In doing so, an important key to higher-speed processing is how individual processors are operated at higher operating rate.

To have a plurality of processors execute task processing in parallel with each other, an OS (operating system) normally takes charge of such processes as division of processing into tasks, assignment of the tasks to the respective processors, switching of processing, and control of access from each processor to main memory or I/O units. On the other hand, there have been propositions of techniques for user-level scheduling in which a user-level task operating on the OS carries out scheduling and such other control of task processing. For example, there is a technology proposed for storing tasks in a queue of main memory and having a task executing processor itself select a task from the queue and execute it (See Patent Document 1, for instance).

Details of certain know systems and devices may be found in JP 2007-52511.

As described above, it is now a wide-spread art that the processing speed of a program is ensured by having a plurality of processors execute task processing in parallel with each other. At the same time, since there are ever-increasing needs of users for sophisticated processing at higher speeds, there exists much demand for technologies that can realize more efficient processing by maximizing the use of a limited number of resources.

SUMMARY OF THE INVENTION

The present invention has been made in view of these problems, and a purpose thereof is to provide a technology that allows efficient execution of necessary processing by a plurality of processors.

One embodiment of the present invention relates to an information processing apparatus. This information processing apparatus includes: a task processing unit configured to process a program task; a processing requesting unit configured to add an execution rule to a program task of an external program of a running application so as to issue a processing request, when the external program is called; a task allocation unit configured to incorporate the program task of the external program, to which the processing request has been issued by the processing requesting unit, into a schedule management of task processing in the task processing unit; an execution monitoring unit configured to determine whether or not the execution rule added by the processing requesting unit is violated in the task processing of the external program in the task processing unit; and an execution control unit configured to switch the processing of the task processing unit to the program task of the external program, when the execution monitoring unit determines that the execution rule has been violated.

For example, the "external program" may be a library, a kernel or the like by which to achieve functions generally provided by an OS but the type or content thereof should not be considered as limiting as long as it is a program other than a calling program.

Another embodiment of the present invention relates to an information processing method. This information processing method includes: processing a program task to be executed by a processor; incorporating a program task of a system-level program into a user-level schedule management performed on a program task of a running application, when the system-level program other than the running application is called; and processing the task of the system-level program, incorporated into the user-level schedule management, by the processor.

Optional combinations of the aforementioned constituting elements, and implementations of the invention in the form of methods, apparatuses, systems, computer programs, and so forth may also be effective as additional modes of the present invention.

The present invention easily achieves efficient execution of parallel processing by a plurality of processors.

BRIEF DESCRIPTION OF DRAWINGS

FIG. 9 shows an example of allocation conditions set for workloads, respectively.

FIG. 10 shows schematically an exemplary process, according to a second embodiment, where processing units each selects a workload and processes the selected workload with the allocation conditions of FIG. 9 set.

FIG. 11 shows schematically a processing procedure when a system processing is executed as a virtual workload in a second embodiment.

FIG. 12 shows an exemplary conversion table referenced when a task allocation unit converts a requested system processing into a virtual workload in a second embodiment.

DETAILED DESCRIPTION OF THE INVENTION

First Embodiment

Figure 1:
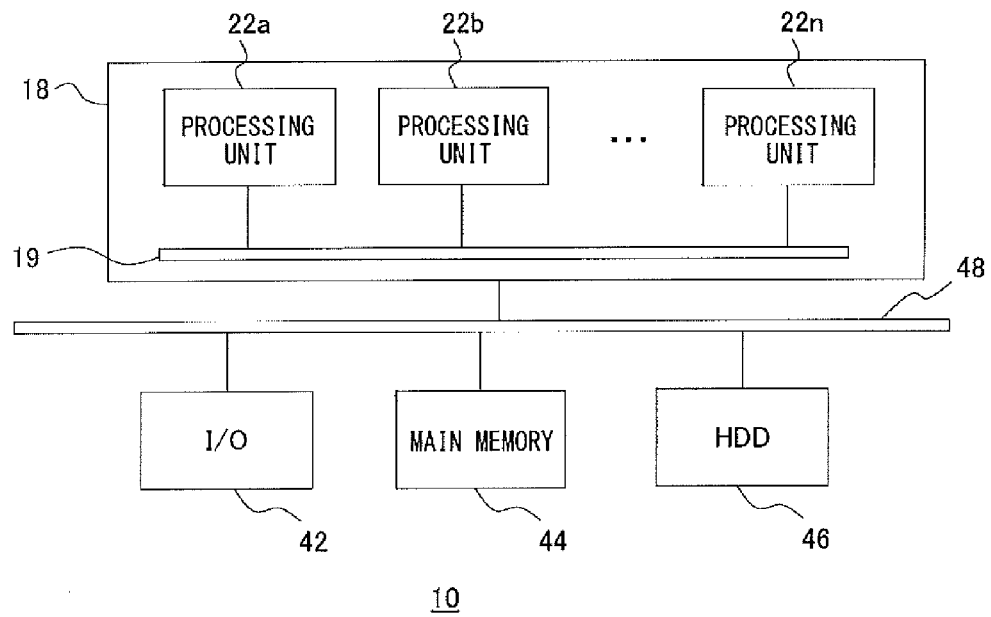
FIG. 1 shows a exemplary structure of an information processing apparatus to which a first embodiment is applicable.

FIG. 1 shows an exemplary structure of an information processing apparatus to which the present embodiment is applicable. The information processing apparatus 10 includes a microprocessor unit 18, an input-output unit (I/O) 42, a main memory 44, and an auxiliary storage (e.g., HDD) 46, which are connected to each other via a bus 48. The microprocessor unit 18 is of such constitution that a plurality of processing units 22a, 22b, . . . , 22n are connected with each other via an internal bus 19.

The processing units 22a, 22b, . . . , 22n are each a processing unit which includes an arithmetic device, local memory, and so forth. The processing units 22a, 22b, . . . , 22n process tasks of OS and also process tasks of booted application program (hereinafter referred to simply as "application"). The input-output unit (I/O) 42, the main memory 44 and the auxiliary storage (HDD) 46 may be constituted by an input-output unit, memory, and auxiliary storage, respectively, which are installed in commonly-used information processing apparatus.

In the information processing apparatus 10 having a structure as shown in FIG. 1, it is necessary that at least any one of the processing units 22a, 22b, . . . , 22n performs system-level processing, which is, for instance, a processing requiring access to a device such as the input-output unit 42 or the main memory 44. Hereinafter, such processing will be called "system processing". In contrast to this, task processing at user level, such as processing of an application, can be construed as user processing. The processing units that do not execute system processing process mainly application and other user-level tasks in parallel with each other.

Figure 2:
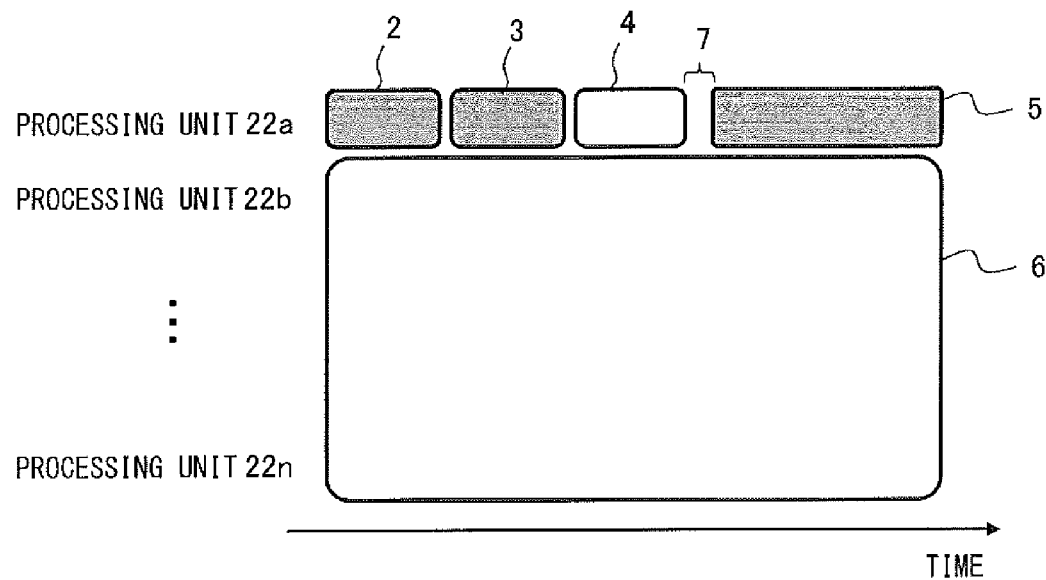
FIG. 2 shows conceptually a progress of task processing at processing units when a single processing unit only is used for the execution of system processing.

In such a case, it is desirable that high-speed processing of an application is realized by having a processing unit execute not only system processing but also task processing of an application in the idle time of system processing. FIG. 2 shows conceptually a progress of task processing at the processing units 22a, 22b, . . . , 22n when the processing unit 22a is used as a processing unit for executing system processing. In FIG. 2, the horizontal axis represents time, and of the rectangles representing tasks to be processed by the processing units, the blank rectangles represent application tasks and the shaded ones represent tasks of system processing.

The processing unit 22a processes system processing tasks 2, 3, and 5 and also processes an application task 4 in the idle time. On the other hand, the other processing units 22b, . . . , 22n process application tasks 6 at all times. Although not shown in FIG. 2, tasks 6 are, of course, processed by the respective processing units independently, and context switching is performed as appropriate within the same processing unit.

It is often the case that a system processing requires higher priority than application tasks. Thus, in a mode of operation such as shown in FIG. 2, if a task 5 of system processing occurs during the processing of the application task 4 by the processing unit 22a, the application task 4 will have no choice but give up the processing unit 22a to the task 5 of system processing irrespective of the user-level scheduling.

At the stage of producing an application, it is difficult to predict how system processing will occur. Therefore, even when the application is produced for parallel processing, it is hard to solve the problem of how the task 4 to be assigned to the processing unit 22a is partitioned. For example, the time when the processing unit 22a can process an application task cannot be predicted; thus, even when a need to communicate with the processing units 22b, . . . , 22n, which are processing tasks 6 of the same application, arises, there is no guarantee that the communication processing can be executed in satisfactory timing. Furthermore, since the application task 4 must be brought to a sudden halt, there will be more data to be stored and longer time 7 for context switching.

Figure 3:
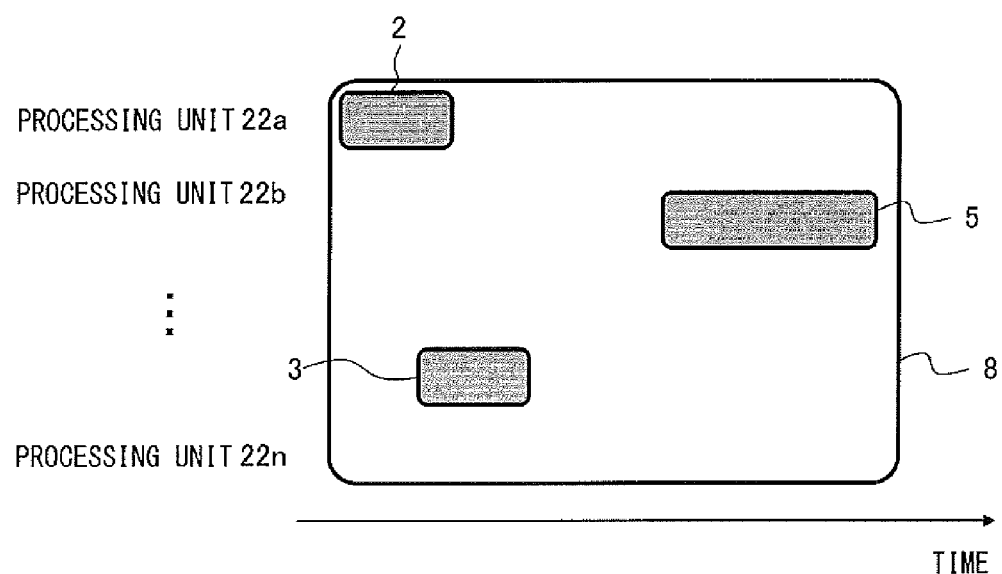
FIG. 3 shows conceptually an example of the progress of task processing at each processing unit in which system processing is scheduled by a user-level scheduler as a mode of operation in a first embodiment.

According to the first embodiment, in order to realize high-speed processing while avoiding circumstances as described above, the processing scheduling of system processing is carried out by a user-level scheduler, thus incorporating it into the user-level processing schedule. FIG. 3 shows conceptually an example of the progress of task processing at the processing units 22a, 22b, . . . , 22n in which the scheduling of system processing by the user-level scheduler is realized as a mode of operation. The representation in FIG. 3 is the same as that in FIG. 2.

As shown in FIG. 3, all the processing units 22a, 22b, . . . , 22n basically execute application tasks 8. And when system processing task 2, 3, or 5 occurs, scheduling according to the procedure of the introduced user-level scheduling is performed such that one of the processing units executes the processing. For example, the system processing is assigned by selecting a processing unit that is processing an application task of a lower priority level, a task least related to the tasks being processed by the other processing units, or the like. At this time, the processing unit to which the system processing is assigned starts the system processing either by halting the application task it is currently executing in appropriate timing from the viewpoint of context switching or when the processing of the current task is completed.

As such, it is not only possible to distribute the load of system processing, but also avoid the circumstances where an application task is suddenly brought to a halt by a task of system processing. As a result, both of the system processing and the application tasks can progress as far as possible. This will help avoid the aforementioned condition of one processing unit only having difficulty of communication necessary for an application. Therefore it is easy to prepare a program, which may be one for parallel processing using all the processing units. Moreover, the time required for context switching can be reduced, thereby contributing to an improvement of overall processing speed.

Figure 4:
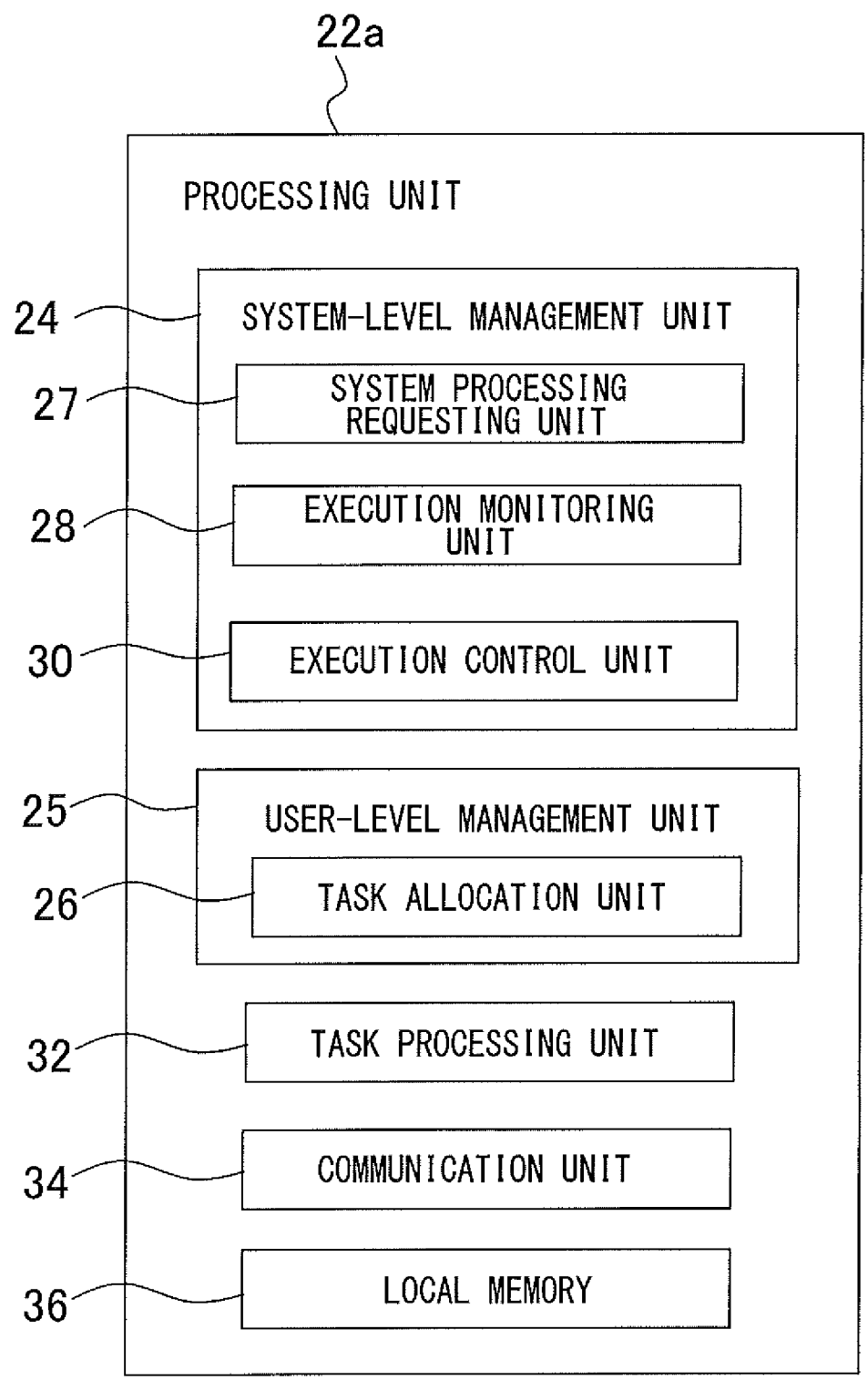
FIG. 4 shows a detailed constitution of a processing unit according to a first embodiment.

FIG. 4 shows a detailed constitution of a processing unit 22a. As shown in FIG. 1, the information processing apparatus 10 may have processing units other than the processing unit 22a, and there is no limitation on the number of the processing units.

The processing unit 22a includes a system-level management unit 24 for managing tasks of system processing and a user-level management unit 25 for managing user-level tasks such as application tasks. The system-level management unit 24 includes a system processing requesting unit 27, which issues a system processing request to the user-level management unit 25 when there occurs a need for system processing such as when a system-based program is called in a task being processed, an execution monitoring unit 28, which monitors the execution of system processing by a processing unit, and an execution control unit 30, which forces the execution of system processing by any one of the processing units 22a, 22b, etc., when there is any violation of the execution rule of system processing. The user-level management unit 25 includes a task allocation unit 26 that divides mainly application and other user-level programs into tasks and assigns them to the processing units.

The processing unit 22a further includes a task processing unit 32, which processes an assigned task according to schedule, a communication unit 34, which notifies the system-level management unit 24 of a ready state when it is ready to start system processing, and a local memory 36, which stores data necessary for task processing by reading it out from the main memory 44. It should be appreciated that the other processing units 22b, ..., 22n may be of the same constitution as the processing unit 22a or may be of a constitution such that they possess only partial functional blocks such as the task processing unit 32, the communication unit 34 and the local memory 36. In the latter case, the processing unit that has the system-level management unit 24 and the user-level management unit 25 may manage the task processing by the other processing units that do not have them.

Those structural components described as functional blocks in conjunction with FIG. 4 may be implemented hardwarewise by elements such as a CPU (Central Processing Unit), memory and other LSIs, and softwarewise by memory-loaded programs or the like. Therefore, it will be obvious to those skilled in the art that the functional blocks may be implemented by a variety of manners including hardware only, software only or a combination of both and are not limited to any particular manner. For example, the user-level management unit 25 may be one of tasks processed by the task processing unit 32; in this case, such a functional block may be thought of as a part of the task processing unit 32.

For instance, when a library offered by the OS is called by a task being processed by the processing unit 22a, 22b or the like, the system processing requesting unit 27 of the system-level management unit 24 generates a system processing corresponding to the library and requests the execution of the system processing by conveying the information on the system processing to the task allocation unit 26 of the user-level management unit 25.

It is to be noted here that the information concerning system processing to be conveyed to the task allocation unit 26 should contain the rules for execution of the system processing. The rules for execution are, for instance, the deadline for execution, which is the permissible time before the start of system processing, and the processing unit to be assigned to perform the execution. When an execution rule is violated, for example, when a system processing is not executed even after the deadline for execution, the system processing is executed by forcing an application task at one of the processing units to a halt. The information on execution rules, the information on timing for issuance of a processing request, and the like are shared within the system-level management unit 24.

The execution monitoring unit 28 monitors the observance of execution rules, such as whether or not a system processing has been executed within the execution deadline by one of the processing units 22a, 22b, etc. Where the deadline for execution is specified as a rule for execution, a not-shown timer, for instance, may be provided for the execution monitoring unit 28, which measures the elapsed time from the issuance of a system processing execution request by the system processing requesting unit 27. And when a notification of acceptability of the system processing from the communication unit 34 is not received within the deadline for execution measured by the timer, it is determined that there has been a violation of a rule for execution of the system processing.

When any violation of an execution rule for a system processing has been determined by the execution monitoring unit 28, the execution control unit 30 has the system processing executed by bringing a task being processed by the processing unit 22a, 22b, or any other or all the tasks being processed by the processing units 22a, 22b, ..., 22n to a halt. This process can be implemented in a similar manner to an ordinary preemption process by the kernel of OS or the like.

The execution control unit 30 further causes a processing unit assigned to execute a system processing to execute the system processing when the execution control unit 30 detects that the processing unit has halted its current application task and stored the register value or the like.

The task allocation unit 26 of the user-level management unit 25 assigns application tasks started up by a user to the processing units 22a, 22b, etc. As new tasks occur, the task allocation unit 26 has them stored successively in a task queue provided in the main memory 44 or the like. In this arrangement, the processing units 22a, 22b, etc., retrieve tasks successively from the task queue and process them whenever they have halted or finished processing the current tasks. Or the task allocation unit 26 assigns new tasks to the processing units 22a, 22b, etc. so that the new tasks can be processed in appropriate timing after making adjustments with the already-scheduled tasks thereat based on the priority level of the tasks, the required number of processing units, the required processing time and the like. The process like this can be accomplished by applying techniques normally used in the multitask-compliant OS or the user-level OS.

Upon receipt of a system processing execution request from the system processing requesting unit 27, the task allocation unit 26 further assigns the system processing to any of the processing units. In this arrangement, information on the system processing is stored in the above-mentioned task queue together with the other tasks. Or since the information received from the system processing requesting unit 27 contains the rules for execution of the system processing, the task allocation unit 26 performs a scheduling in such a manner as will satisfy the execution rules.

The task processing unit 32 processes successively the tasks of applications and system processing, assigned by the task allocation unit 26, according to schedule. Data necessary for the processing of tasks, such as programs, is to be read out in advance from the main memory 44 to the local memory 36. Also, when switching the tasks, context switching is carried out in which the context of the task having been processed thus far is stored in the main memory 44 and the context of the next task is restored.

When a system processing is assigned by the task allocation unit 26, the task processing unit 32 stores the context of the application task according to the schedule and then the communication unit 34 conveys the completion of the step to the system-level management unit 24. Thus, the system processing is executed under the control of the execution control unit 30 of the system-level management unit 24. Also, when there occurs a violation of some execution rule as described above, the context switching is carried out at that point in which the task processing unit 32 switches the contexts from the application task being processed to the system processing under the control of the execution control unit 30.

Figure 5:
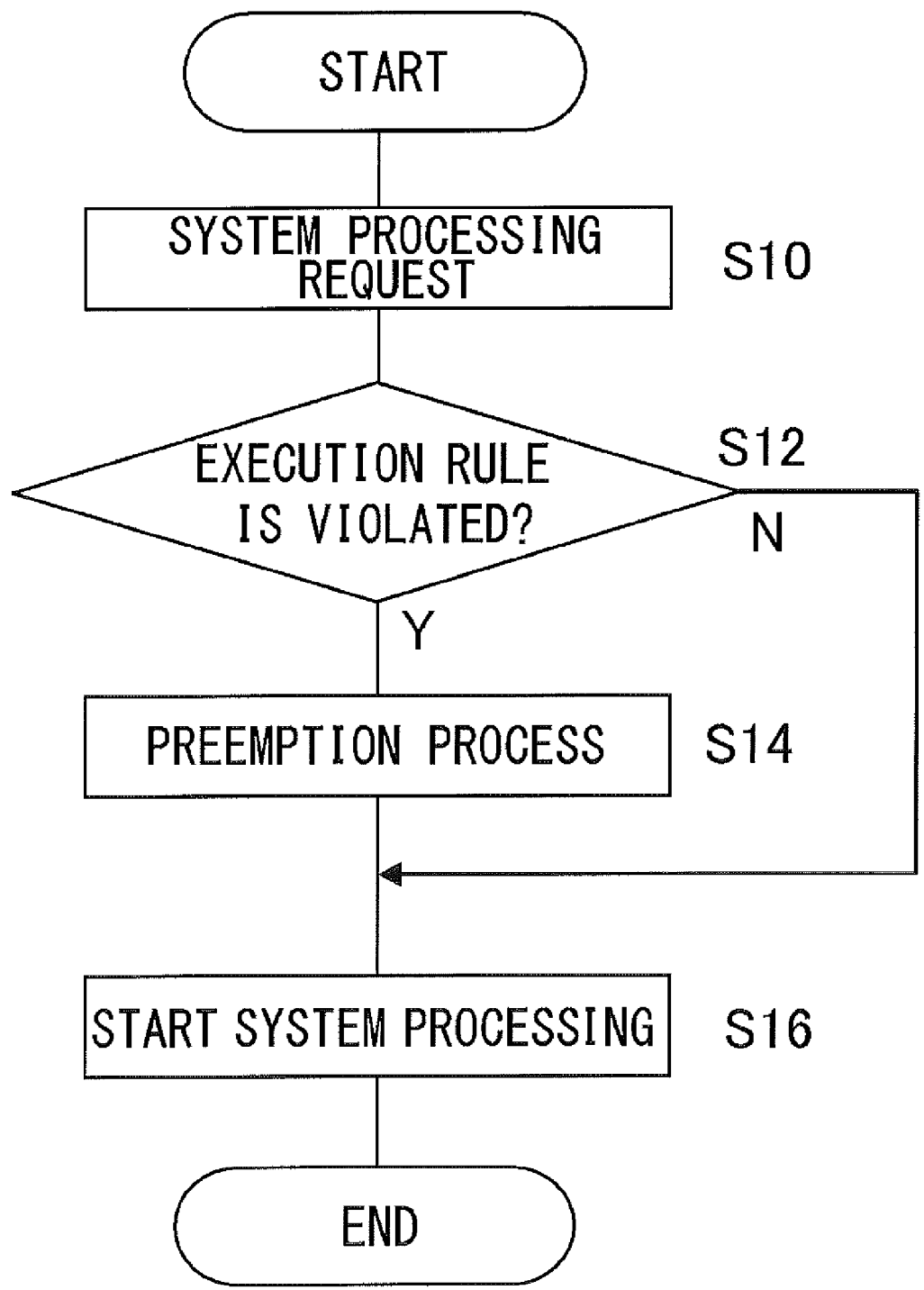
FIG. 5 is a flowchart showing a general flow from the occurrence to the start of a system processing in a first embodiment.

Now a description will be given of an operation of the first embodiment implementing the structure as described above. FIG. 5 is a flowchart showing a general flow from the occurrence of a system processing to the start thereof in the first embodiment. Firstly, let us assume as a precondition that application tasks or the like started up by the user are being processed by the processing units 22a, 22b, ..., 22n according to the schedule at that point. Under these circumstances, when, for instance, a task being processed calls the library offered by the OS, the system processing requesting unit 27 of the system-level management unit 24 generates a system processing corresponding to the library and delivers a processing request to the task allocation unit 26 of the user-level management unit 25 (S10).

Now, if the task allocation unit 26 having received the request fails to assign the system processing to any of the processing units or if the processing unit having received the assignment fails to halt the application task for some reason, the execution monitoring unit 28 will determine a violation of the execution rule (Y of S12). Then the execution control unit 30 brings one or all of the processings at the processing units 22a, 22b, ..., 22n to a halt and performs a preemption process for use in the system processing (S14). If all the processing units are brought to a halt at this time, then the system processing may be executed using at least one of the processing units. Also, when one or some of the plurality of processing units 22a, 22b, ..., 22n are brought to a halt and the system processing is performed by them, the arrangement may be such that the processing unit to be halted are selected according to the rules of a preset priority level or by arbitrary choice.

On the other hand, if the task allocation unit 26 assigns a system processing and the assigned processing unit carries out the context switching for the processing, then the execution monitoring unit 28 will determine that there is no violation of the execution rule (N of S12). Then the task processing unit 32 of the processing unit starts the system processing (S16). The system processing is also started similarly when the preemption process has been performed in Step S14 (S16).

Figure 6:
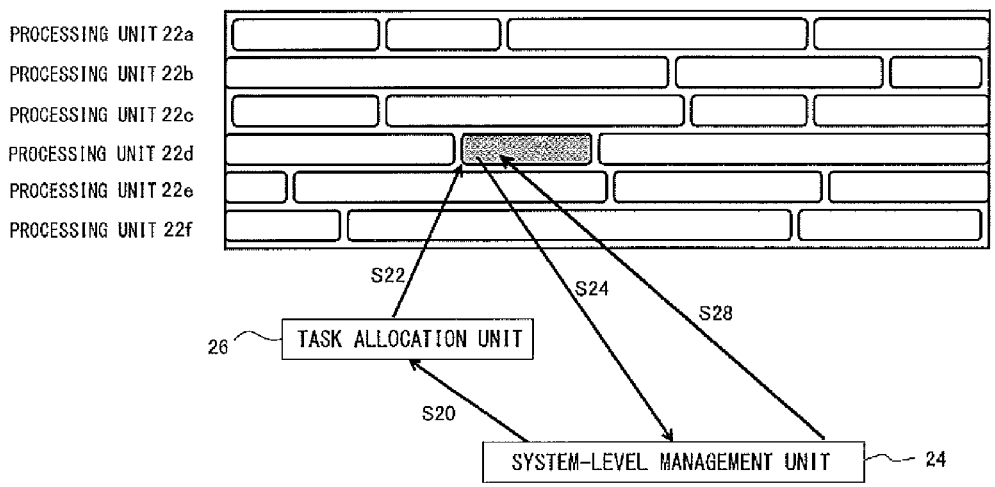
FIG. 6 shows schematically a processing procedure for the execution of a system processing in a first embodiment.

FIG. 6 shows schematically a processing procedure for the execution of a system processing. It is assumed here that a deadline for execution is set for the system processing. Similar to FIG. 2, the horizontal direction is the time axis, and the blank rectangles represent application tasks and the shaded one the task of system processing. In FIG. 6, six processing units 22a, 22b, ..., 22f are processing their application tasks, respectively. In this condition, the system processing requesting unit 27 of the system-level management unit 24 firstly makes a system processing request to the task allocation unit 26 as in Step S10 of FIG. 5 (S20). The task allocation unit 26 assigns the processing to the processing unit 22d (S22). The selection of this processing unit is to be made based on the priority level of the task being processed or relevance to the tasks being processed by the other processing units as already mentioned. Or else, the information on the system processing is stored in a task queue. In this case, the assignment is substantially carried out as the processing unit that has completed processing a task reads out the information on the system processing from the task queue.

The processing unit 22d assigned to execute the system processing halts the application task in appropriate timing, has the register value or the like stored in the main memory 44 or the like, and sends a notification, indicating that the execution of the system processing is acceptable, to the system-level management unit 24 (S24). The execution monitoring unit 28 of the system-level management unit 24 measures the elapsed time from the processing request in Step S20, and if the notification in Step S24 is received within the deadline for execution, the execution control unit 30 will have the processing unit 22d start the system processing (S28).

Here, suppose that the notification of acceptability in Step S24 is not done within the deadline for execution, such as when the task assignment in Step S22 is not done for some reason or when the processing unit 22d cannot accept the system processing. Then, the execution monitoring unit 28 will determine a violation of the execution rule, and the preemption process in Step S14 of FIG. 5 will be carried out by the execution control unit 30. With the above-described process repeated whenever a system processing occurs, the mode of carrying out the present invention as shown in conjunction with FIG. 3, in which a system processing is executed in necessary timing while all the processing units 22a, 22b, ..., 22n are used for processing applications, can be accomplished.

Figure 7:
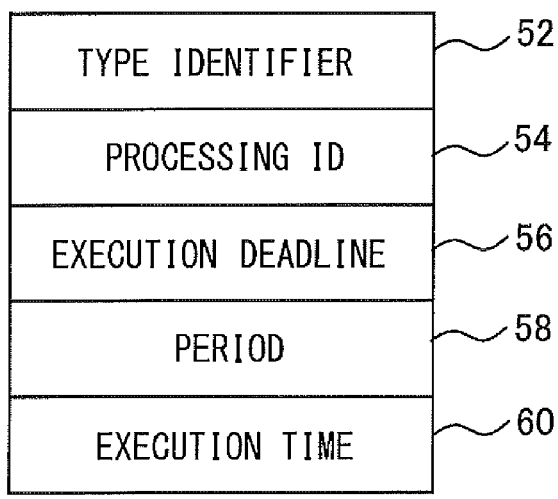
FIG. 7 shows an example of data structure of information on a system processing to be communicated when a system processing requesting unit makes a system processing request to the task allocation unit in a first embodiment.

FIG. 7 shows an example of data structure of the information on a system processing to be communicated when the system processing requesting unit 27 makes a system processing request to the task allocation unit 26. System processing data 50 includes type identifier 52, processing ID 54, execution deadline 56, period 58, and execution time 60. The type identifier 52 is identification information for identifying the type of system processing, such as audio decoder or echo canceller, and the correspondence between types and identifiers, which is to be determined in advance, is stored in the main memory 44 or the like. The task allocation unit 26 identifies the type of processing based on the type identifier 52 for the requested system processing, and has it reflected in the scheduling after identifying the priority level predetermined for the particular type.

The processing ID 54 is identification information to be set uniquely for each requested system processing. The processing unit, when it executes a system processing, reads out a program for the system processing from the main memory 44 based on the processing ID. Also, when the communication unit 34 of the processing unit assigned to execute a system processing communicates the readiness for execution of the system processing to the system-level management unit 24, the processing ID is used to distinguish it from communications concerning other system processing. The execution deadline 56 is, for instance, permissible time from the issuance of a request for system processing to the start of execution. As already described, when the notification of acceptability of the system processing is not sent from the processing unit even past this time, a preemption process is carried out by the execution control unit 30. When a plurality of system processings occur, the arrangement may be such that the task allocation unit 26 determines the priority order for assignment among the system processings by the use of the execution deadline 56. For example, the assignments may be given to processing units with priority given to the system processing whose execution deadline comes earlier.

The period 58 is the operating period of a system processing. When a plurality of system processings occur, the task allocation unit 26 may determine the assignments to processing units, using a technique such as rate monotonic scheduling, based on the period 58. The execution time 60 is the execution time of a system processing. When a plurality of system processings occur, the task allocation unit 26 may determine the assignments to processing units based on the execution time 60. Also, depending on circumstances, the arrangement may be such that the system processing at the processing unit is forcibly terminated when the execution of the system processing has run beyond the execution time 60.

Presented and achieved in the foregoing description is a mode of carrying out the present invention in which once a system processing is generated by the system-level management unit 24, the system processing is incorporated into the user-level scheduling by exclusively making a processing request to the task allocation unit 26 of the user-level management unit 25. On the other hand, the arrangement may be such that, using the same information processing apparatus 10, a selection can be made by an application program or the like between a mode in which the system processing is incorporated into the user-level scheduling and a mode in which the system processing is executed independently of the user-level scheduling as explained in conjunction with FIG. 2. In such a case, the system-level management unit 24 determines, from the application program being executed, which of the modes is being specified, at the time of occurrence of a system processing.

If the mode in which the system processing is incorporated into the user-level scheduling is specified, the system-level management unit 24 issues a request for the occurring system processing to the task allocation unit 26. If the mode in which the system processing is executed independently of the user-level scheduling is specified, the system-level management unit 24 does not issue a request for processing to the task allocation unit 26, but has the system processing executed by a processing unit by stealing its processing time even when said processing unit is processing a user-level task. Thus, an optimum mode can be selected in accordance with the types and frequencies of necessary system processings when producing applications.

According to the first embodiment described as above, a system processing that occurs during the processing of an application is incorporated into the user-level scheduling process. As a result, the chances will be created that system processings can be executed according to a user-level scheduling policy, and the possibilities will be lowered that application and other user-level tasks are brought to a halt in unexpected timing. Also, since it is easier to distribute the burden of system processing to a plurality of processing units, there will be higher possibilities that a system processing can be executed before the execution deadline without the preemption by the system management unit. Consequently, the processing unit assigned to execute a system processing can bring to a halt an application task that the processing unit is currently processing in appropriate timing, so that an overhead involving the context switching to start the system processing can be reduced. Also, since there will be less likelihood of imbalance in application task processings, the condition of communication difficulty between certain processing units can be avoided, and the parallelization of programs is made easier.

Also, when there is a violation of the execution rule, such as when the system processing by a processing unit exceeds the execution deadline, a main processing unit forcibly switches the processing of the processing unit to the system processing. Thus, the system processing can be executed with greater reliability, and hence adverse effects, such as the delay of system processing resulting from the processing assignment according to the user-level scheduling, can be eliminated. As a result, application tasks can be processed at high speed while reliably executing system processings.

Second Embodiment

Figure 8:
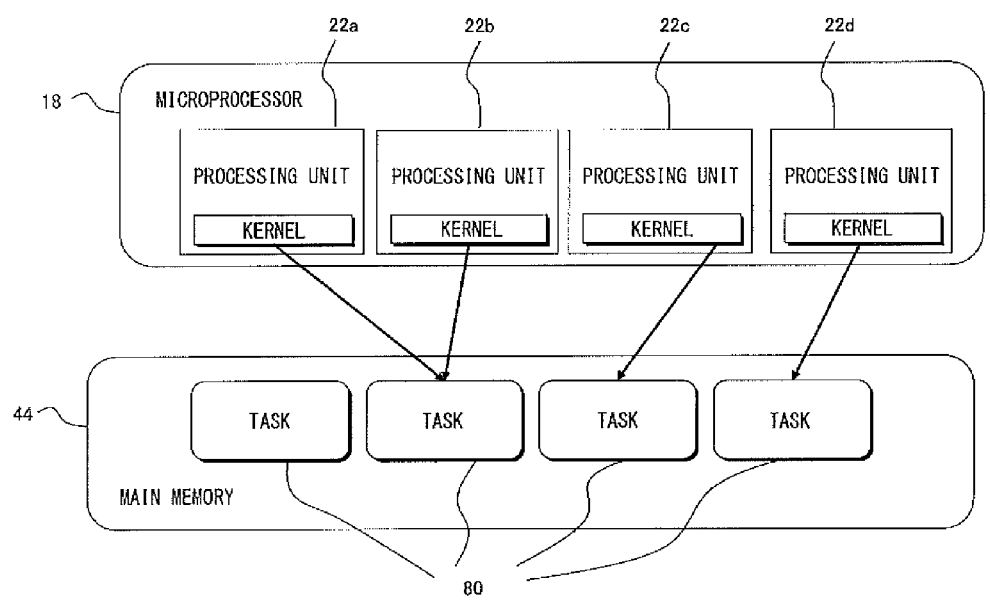
FIG. 8 illustrates briefly an autonomous user-level scheduling used in a second embodiment.

In the first embodiment, schedules are generated in such a manner that the task allocation unit 26 in the user-level management unit 25 assigns each task to a processing unit, as appropriate, based on the priority level, the execution time and the like. According to a second embodiment, a system processing is executed by the processing units according to the schedules, similarly to the first embodiment, by implementing an autonomous user-level scheduling structure wherein each processing unit autonomously selects a task. An example of such a user-level scheduling arrangement may be found in Japanese Unexamined Patent Application Publication No. 2007-52511 and so forth. A brief description thereof is now given herein. FIG. 8 illustrates briefly an autonomous user-level scheduling. In what is to follow, where the same functional blocks as those of the first embodiment may be used, such the functional blocks shown in FIG. 8 are given the same reference numerals as those of the first embodiment. Also, for the same processing procedures as those of the first embodiment, the description thereof will be omitted as appropriate.

In FIG. 8, as the processing unit 22a generates a user-level task such as a task of an application, the task is assigned to any one of groups of processing units included in the information processing apparatus 10. More specifically, data used to execute the assigned task is stored in an area (task queue), within the main memory 44, corresponding to a group of predetermined processing unit or a group of a plurality of predetermined processing units. In the example of FIG. 8, the four processing units 22a, 22b, 22c and 22d constitute a group of processing units, and tasks 80 assigned to this group are stored in the corresponding areas of the main memory 44.

Then, a program of a kernel executing the user-level scheduling is stored in each local memory of the processing units 22a, 22b, 22c and 22d. When the previous task of the application is completed or brought to a halt or when it enters a predetermined period, the processing units 22a, 22b, 22c and 22d each starts the processing of its kernel, selects one task from among the tasks stored in the main memory 44 and copies data, such as a program required for the execution of the selected task, to its own local memory so as to start processing of the selected task.

The tasks stored in the main memory 44 may be a task or tasks of the minimum unit, which can be executed by one time processing in each processing unit, or may be a set of tasks or a job chain where the tasks are aggregated into a predetermined processing unit. Hereinafter, the unit where one or more tasks of the minimum unit are gathered is called "workload". If a macroscopic process, namely an aggregate of tasks or a set or group thereof to achieve a purpose, is formed as the workload, the tasks will be assigned to the processing units in units of workload and thereby the efficient processing can be carried out. For example, where a plurality of processing units are required for the execution of a workload, the plurality of processing units required accordingly are basically reserved and secured simultaneously so as to execute the workload. Thus, the information on allocation conditions including (i) the number of processing units required, (ii) the priority level in each processing unit and (iii) the maximum number of processing units assignable (quota) is appended to each workload.

The processing units 22a, 22b, 22c and 22d read out information concerning the workloads and then each selects a workload based on the priority level and the like in each processing unit so as to process the tasks. FIG. 9 shows an example of the allocation conditions set respectively for four workloads wherein the allocation conditions are the priority level and the maximum number of processing units assignable to each workload. In the example of an allocation condition table 90 shown in FIG. 9, the workloads to be processed are listed in a workload column 92 and they are "workload P" for physics computation, "workload A" for artificial intelligence, "workload G" for graphics processing, and "workload M" for audio processing.

The priority levels of four workloads for each processing unit in terms of each workload and the maximum number of processing units assignable to each workload are described in a priority column 94 and a maximum-number-of-processing-units column 96, respectively. For example, in the case of "workload P", the priority levels thereof in the processing unit 22a, 22b, 22c and 22d are set to "1", "0", "2" and "2", respectively. Also, the maximum number of processing units assignable to "workload P" is set to "2". The priority levels and the maximum numbers of processing units assignable to the other workloads are set in a similar manner.

In the case of FIG. 9, the values shown in the priority column 94 are defined, excepting "0", such that the smaller the value, the higher the priority level is. For example, the priority levels of workloads in the processing unit 22a is such that "workload P" has the highest priority and "workload G" has the second highest priority. The priority level "0" indicates that no processing is performed on the workload by the processing unit. If no maximum number of processing units assignable is set, the maximum-number-of-processing-units column 96 is left blank there. Such settings as described above are done for each application when a program is to be prepared.

FIG. 10 shows schematically an exemplary process where the processing units 22a, 22b, 22c and 22d each selects a workload and processes the selected workload with the allocation conditions of FIG. 9 set. In FIG. 10, the vertical direction represents time, and each rectangle shown below each processing unit is a task or the processing of a given workload. During a small time interval including time t0 in FIG. 10, the processing units 22a, 22b, 22c and 22d are processing the tasks of their highest priority levels, namely "workload P", "workload A", "workload G" and "workload G", respectively.

When at time t1, for instance, the tasks of "workload G" processed by the processing units 22c and 22d are set to a standby state due to a device access, these processing units 22c and 22d each tend to select a task of the second highest priority level, namely "workload P". However, the maximum number of processing units capable of processing the tasks of "workload P" is "2". Thus, when the processing unit 22c selects "workload P", the processing unit 22d selects "workload M" of the third highest priority level. As the standby state due to the device access is cleared in the meantime T, the processing units 22c and 22d each selects again "workload G" in timings with which "workload P" and "workload M" can be put on hold temporarily, respectively, and each starts the execution of tasks of "workload G" (at time t2).

In this manner, the task processing progresses autonomously by a kernel operated in each processing unit according to the allocation conditions, which is specified by an application, including the priority level and the maximum number of processing units assignable (or the required number of processing units). At this time, a task or tasks having a lower priority level in each processing unit is/are brought to a halt and yielded to a task or tasks of a higher priority level in suitable timing. Hence, the time required for context switching can be minimized, while the switching is performed according to the priority level. Also, since the priority level can be specified for each processing unit, the tasks can be easily assigned to the processing units. It is appreciated here that FIG. 9 and FIG. 10 are for illustrative purposes only and the arrangement may be, for example, such that the priority level only is used as the allocation condition or other parameters are used.

In the second embodiment, the system processing is incorporated into user-level scheduling in an information processing apparatus where such an autonomous use-level scheduler is introduced. More specifically, a system processing is generated as a virtual workload and thereby the system processing is incorporated into scheduling of a user-level scheduler. This mode of carrying out the present invention can be achieved by employing a structure similar to that of the information processing apparatus 10 shown in FIG. 1 and FIG. 4 of the first embodiment. According to the second embodiment, however, the task allocation unit 26 does not directly assign tasks to the processing units but assigns a workload to a group of processing units and then stores the necessary data and allocation conditions in an area within the main memory 44 corresponding to the group of processing units, as described above.

FIG. 11 shows schematically a processing procedure when a system processing is executed as a virtual workload in the second embodiment. Similar to FIG. 6, the blank rectangles represent application tasks and the shaded one is the task of system processing (virtual workload). In FIG. 11, the four processing units 22a, 22b, 22c and 22d form a group of processing units, and they process the tasks, which constitute a workload of assigned application, respectively. In this condition, the system processing requesting unit 27 of the system-level management unit 24 firstly makes a system processing request to the task allocation unit 26 (S40). The task allocation unit 26 converts the processing request into a virtual workload according to predetermined rules and then stores the converted request in a corresponding area of the main memory 44 (S42).

Then, of the group of processing units, a processing unit that has completed or halted the previous task processing, namely the processing unit 22d in the example of FIG. 11, selects the virtual workload of system processing from the main memory 44 and loads the selected workload into its own local memory (S44). When the processing of the virtual workload becomes feasible, the processing unit 22d sends a notification of the feasibility to the system-level management unit 24 (S46).

The execution monitoring unit 28 of the system-level management unit 24 measures the elapsed time from the processing request in Step S40, and if the notification in Step S46 is received within the deadline for execution, the execution control unit 30 will have the processing unit 22d start the system processing (S50). If there is any violation of the execution rule, any of the processing units 22a, 22b, 22c and 22d or all of them may be brought to a halt so as to have them execute the system processing similarly to the first embodiment.

A description is now given of a method where the task allocation unit 26 converts the system processing requested by the system-level management unit 24 into a virtual workload. FIG. 12 shows an exemplary conversion table referenced when the task allocation unit 26 converts a requested system processing into a virtual workload. A conversion table 100, which is set beforehand, is stored in the main memory 44 or the like. The conversion table 100 includes a group column 102, a type column 104, a resource allocation unit column 108, and a user parameter column 110.

The task allocation unit 26 receives, from the system processing requesting unit 27, information similar to the information, shown in FIG. 7 of the first embodiment, concerning the system processing. Based on the type identifier 52 in such items of information, the type of the requested system processing is searched in the type column 104 of FIG. 12. As shown in FIG. 12, each type is grouped into a group indicated in the group column 102, and parameters necessary as a workload are set for each group.

Whether to assign a resource, such as processing units, with each group as the unit or to assign per type is set in the resource allocation unit column 108. In the example of FIG.

12, where "group" is set forth in the column 108, the resource is shared by a single group. Where "per type" is set forth in the column 108, the resource is assigned for each type set forth in the type column 104. Parameters which can be set per application are set in the user parameter column 110. Here, those parameters set forth in the user parameter column 10 include processing unit(s) to which the system processing is assigned, the maximum number of processing units assignable to the system processing, and an identifier of a priority level table where the priority order of each processing unit is determined. The priority level table, whose components are associated with the identifiers, is prepared in advance. The task allocation unit 26 finally determines the values as shown in the priority column 94 and the maximum-number-of-processing-units column 96 of FIG. 9, based on the above-described settings.

Figure 13:
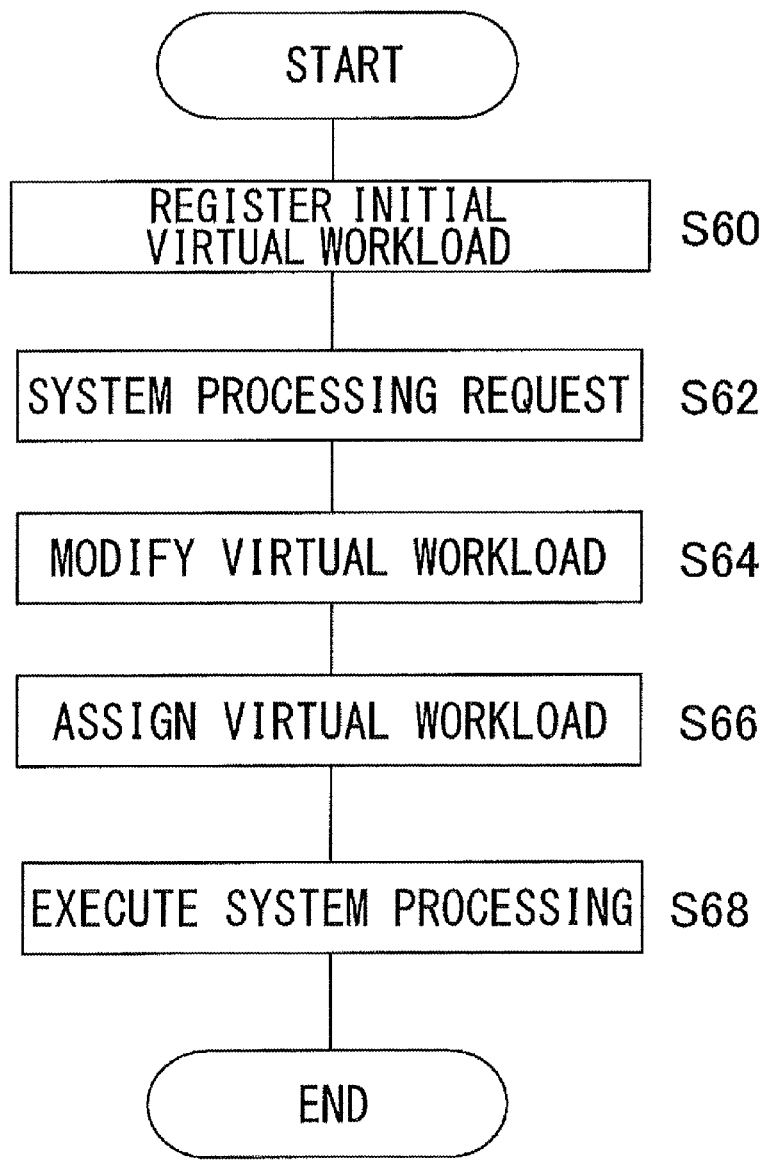
FIG. 13 is a flowchart showing a processing procedure for executing a system processing when an autonomous user-level scheduler is introduced in a second embodiment.

A description is now given of an operation of the information processing apparatus of the second embodiment configured as above. FIG. 13 is a flowchart showing a processing procedure for executing a system processing when the autonomous user-level scheduler is introduced. When an application is to be started or a mode becomes necessary in which the system processing is performed according to the user-level scheduling, the task allocation unit 26 firstly registers a virtual workload at its initial state, in the main memory 44 similarly to the workload of application (S60). For the virtual workload at the initial state, the number of processing units requested is set to the initial value "0".

Then it is assumed that the task of the application is processed by each processing unit according to the autonomous user-level scheduling. Under these circumstances, when, for instance, a library offered by the OS is called, the system processing requesting unit 27 of the system-level management unit 24 generates a system processing corresponding to the library and makes a processing request to the task allocation unit 26 (S62).

The task allocation unit 26 having received the request modifies the virtual workload, at the initial state, registered in Step S60 according to the information contained in the request (S64). For example, based on the processing ID of the system processing, the preset number of processing units required for the execution of the processing is identified and then the initial value "0" in the virtual workload is modified. The above-described priority levels can also be determined. Following the modification where the set number of processing units required for the virtual workload has been changed to one or more, the kernel operated in each processing unit starts the selection of a virtual workload. As a result, the virtual workload is substantially assigned to the processing units the number which corresponds to the required number thereof (S66).

Then, each of the processing units that have selected the virtual workloads starts up a program for virtual workloads prepared beforehand, loads a program from the main memory 44 based on the processing ID, and executes the system processing (S68).

Figure 14:
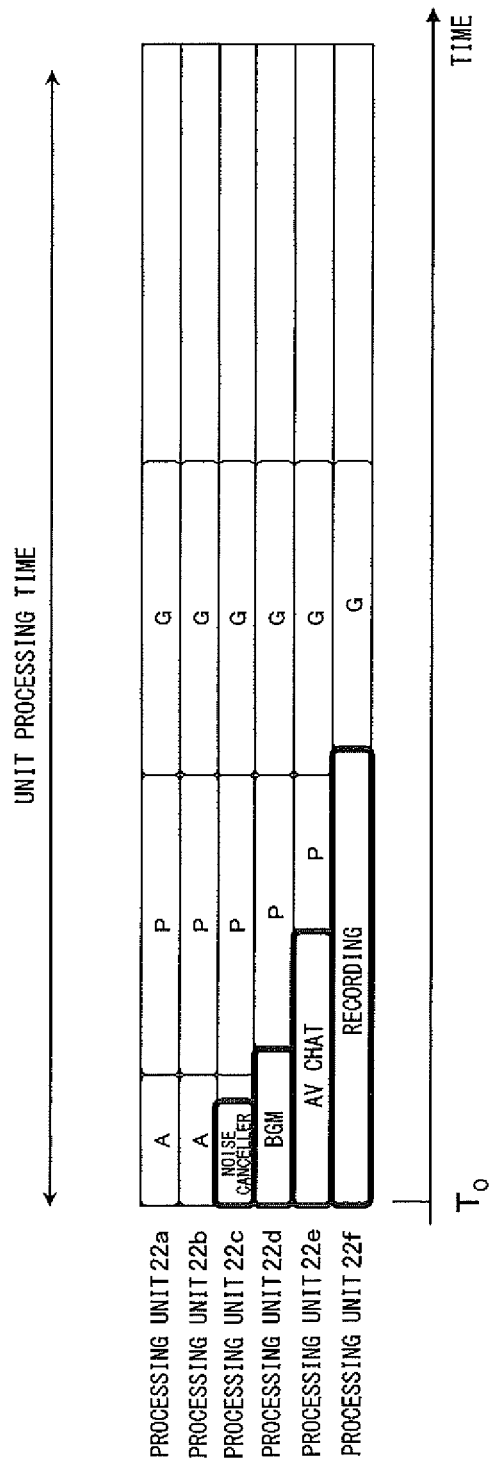
FIG. 14 shows an exemplary progress of processings, performed by six processing units, which can be achieved by a second embodiment.
Figure 15:
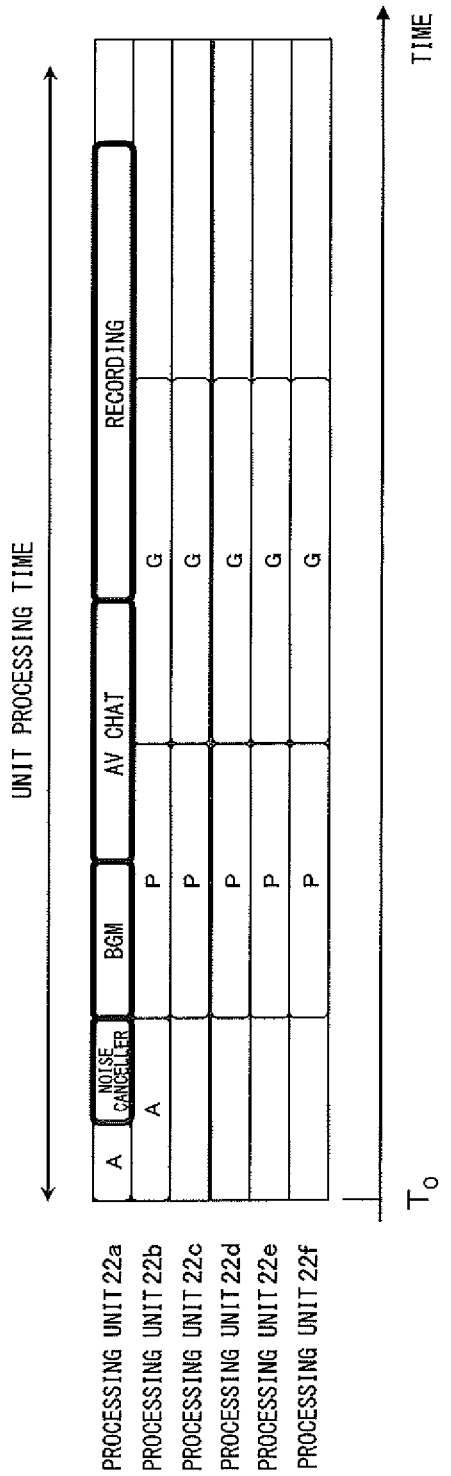
FIG. 15 shows another exemplary progress of processings, performed by the six processing units, which can be achieved by a second embodiment.
Figure 16:
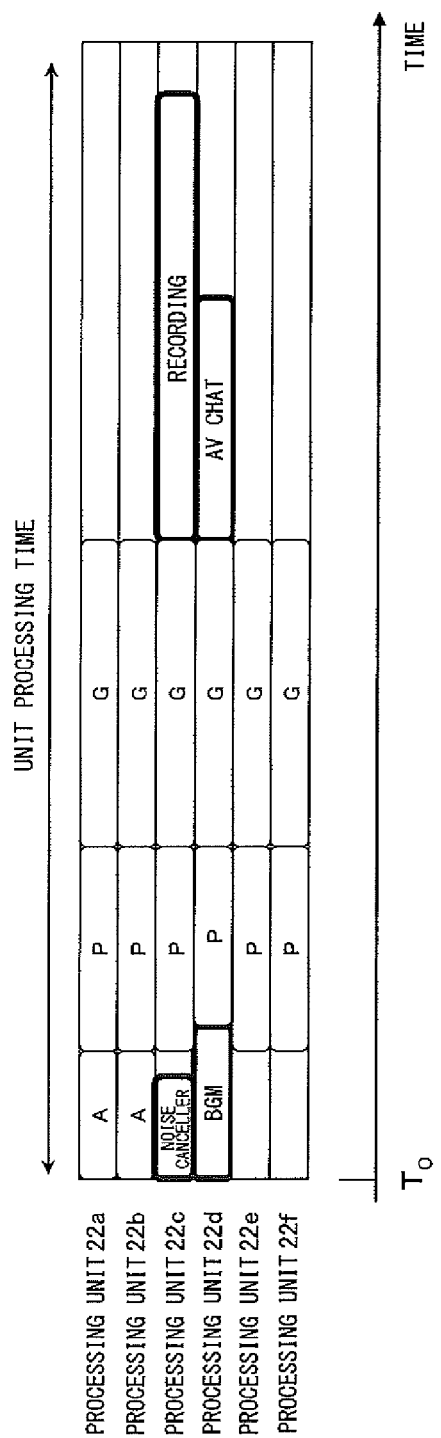
FIG. 16 shows still another exemplary progress of processings, performed by the six processing units, which can be achieved by a second embodiment.

FIG. 14 to FIG. 16 each shows an exemplary progress of processings, performed by six processing units 22a, 22b, 22c, 22d, 22e and 22f, which can be achieved by the second embodiment. The horizontal direction represents time, and each rectangle indicates which task is processed during a given unit processing time in each processing unit. The tasks in which "P", "A" and "G" are set forth in FIG. 14 to FIG. 16 are tasks of application corresponding to the above-described "workload P" for physics computation, the "workload A" for artificial intelligence and the "workload G" for graphics processing, respectively. Assume in the example of FIG. 14 to FIG. 16 that the processing always progresses in the order of "A", "P" and "G".

It is also assumed that the system processings of noise canceller, system BGM, AV chat and recording are requested at time T0 in such an environment where the application task processings are being processed. In FIG. 14 to FIG. 16, each system processing is indicated by a heavy-line rectangle, and the respective system processings are distinguished from each other by having them labeled with "noise canceller", "BGM", "AV chat" and "recording". As described above, the processing units and the like to which the respective system processings to be assigned can be set for each group belonging to each processing, using the conversion table 100 shown in FIG. 12.

FIG. 14 illustrates an example where a mode of assignment is set such that each system processing may be assigned to an arbitrary processing unit. The processing unit to which each system processing can be assigned is specified on the conversion table by the user using a bit mask, for example. In the case of FIG. 14, the processing units 22c, 22d, 22e and 22f start the respective system processings at time T0. While the system processings are being executed, task "A" of application is being processed by two processing units 22a and 22b. Thus, even though the system processings are being executed, the processing of subsequent tasks "P" and "G" of application progresses smoothly using the processing units whose number thereof corresponds to the maximum possible number of capable processing units, without causing any significant delay.

FIG. 15 illustrates an example where a mode of assignment is set such that each system processing may be assigned to the processing unit 22a only. In this example, task "A" is started at T0 among the tasks of application; the processing in the processing unit 22a is switched to the system processing of "noise canceller" in timing suitable for the context switching and then the subsequent system processings progress at the processing unit 22a according to the priority level. In this case, all the processing units can be assigned to the tasks of application during a time duration from time T0 to the switching to the system processing as well as during a time duration after the completion of the system processings.

FIG. 16 illustrates an example where a mode of assignment is set such that each system processing may be assigned to an arbitrary processing unit but the priority level of system processing belonging to utility or heavy-load service is set to a comparatively low level. In this case, the processings of "noise canceller" and "BGM" whose priority levels are high are started at time T0, whereas the processings of "recording" and "AV chat" are started after the completion of the application tasks "G".

In this manner, for example, by enabling to specify the processing units to which a workload is assigned at the time the system processing is converted to the workload, or the like, in a flexible manner, the entire processing can be progressed under an optimal mode for each application.

By employing the second embodiment as described above, the system processing is converted into a virtual workload, in the environment where introduced is the autonomous user-level scheduler by which, when a program is divided into smaller parts and processed in parallel with each other, the processing units themselves select tasks after the division of the program and then execute the selected tasks based on the priority levels. Thereby, the system processing, which is otherwise set aside from the user-level scheduling under normal conditions, can also be handled the same way as the user-level tasks are processed. As a result, the system processing can smoothly progress as well without interfering with the regular scheduling operations performed based on the priority levels.

Also, the priority level of each system processing and specific processing units to be assigned to the execution of each system processing can be specified for applications processed in parallel. And when each system processing is converted into a virtual workload, the settings are done according to said specification. Thereby, the timing, with which the system processing is executed, and the processing units used for the execution can be easily varied for each application, so that the optimal processing mode can be achieved. Further, since the system processing can be handled the same way as the application tasks, the application can be created in the usual manner. Also, similar to the first embodiment, the load of the system processing is distributed and the processing units are operated at their maximum capacities, so that high-speed processing can be realized.

The present invention has been described based upon illustrative embodiments. These exemplary embodiments are intended to be illustrative only and it will be obvious to those skilled in the art that various modifications to the combination of constituting elements and processes could be developed and that such modifications are also within the scope of the present invention.

EXPLANATION OF REFERENCE NUMERALS

10 Information processing apparatus
22a Processing unit
24 System-level management unit
25 User-level management unit
26 Task allocation unit
27 System processing requesting unit
28 Execution monitoring unit
30 Execution control unit
32 Task processing unit
34 Communication unit
36 Local memory
44 Main memory As described above, the present invention is applicable to information processing apparatuses such as a computer, a game device and an image processing apparatus.

The invention claimed is:

1. An information processing apparatus, comprising:
   a task processing unit configured to process application program tasks as user-level tasks;
   a processing requesting unit configured to issue a conditional processing request for a system-level task of a system program that is called by the application program, where the conditional processing request includes a time limit from issuance within which the system-level task must be initiated by the task processing unit;
   a task allocation unit configured to incorporate the system-level task into a scheduling mechanism of the user-level tasks, such that the scheduling mechanism determines an execution order of the user-level tasks and the system-level task within the task processing unit;
   an execution monitoring unit configured to determine whether or not the task processing unit initiates the system-level task within the time limit; and
   an execution control unit configured to force the task processing unit to process the system-level task irrespective of the scheduling mechanism when the execution monitoring unit determines that the task processing unit has not initiated the system-level task within the time limit, wherein:

the scheduling mechanism of user-level tasks includes the task allocation unit storing the user-level tasks to be processed in a user-level task queue in memory,
when the processing requesting unit issues the conditional processing request for the system-level task, the task allocation unit: (i) converts a data format of the system-level task into a data format of the user-level tasks, and (ii) inserts the system-level task having the data format converted into the data format of the user-level tasks amongst the user-level tasks within the user-level task queue,
the task processing unit selects and processes the system-level task from among the tasks stored in the task queue in a same manner as the user-level tasks, and
the conversion of the data format of the system-level task to the data format of the user-level tasks includes adding at least one of: (i) a priority level to the system-level task, and (ii) a number of task processing units assignable to process the system-level task, which are set by the application program that calls the system-level task.

2. The information processing apparatus according to claim 1, wherein:
   the task processing unit operates to issue a notification when execution of the system-level task initiates; and
   the execution monitoring unit operates to determine that the task processing unit has not initiated the system-level task within the time limit when the notification has not issued from the task processing unit within the time limit.

3. The information processing apparatus according to claim 1, wherein
   the task allocation unit identifies information, including at least one of: (1) priority level, (2) execution time limit, (3) operating cycle, and (4) execution time, corresponding to a type of the system-level task, and
   the task allocation unit determines the schedule of the system-level task within the scheduling mechanism of the user-level tasks, based on the information.

4. The information processing apparatus according to claim 1, wherein:
   the task processing unit is one of a plurality of such task processing units,
   wherein the task allocation unit generates a respective schedule of user-level tasks for each of the plurality of task processing units;
   when the processing requesting unit issues the conditional request, the task allocation unit inserts the system-level task into one of the schedules; and
   each of the task processing units processes the tasks according to the respective schedules generated by the task allocation unit.

5. The information processing apparatus according to claim 1, wherein:
   the task processing unit selects from the user-level task queue a task, with task information indicating that the task processing unit assignable thereto is at least one, and
   when the processing requesting unit issues the request for the processing of the system-level task, the task allocation unit modifies task information which has been stored beforehand in the user-level task queue in memory, the task information indicating that the task processing unit assignable thereto is zero as an initial state so as to indicate that the task processing unit assignable thereto is a number of task processing units assignable according to a content of the processing request, so as to incorporate the system-level task into the schedule scheduling mechanism of user-level tasks.

6. The information processing apparatus according to claim 1, wherein:
when the application program is set such that the system-level task to be called is not to be incorporated into the scheduling mechanism of user-level tasks, the processing requesting unit does not issue the conditional processing request, and
the execution control unit forces the task processing unit to process the system-level task at the time it is called regardless of the scheduling mechanism of user-level tasks.

7. The information processing apparatus according to claim 1, wherein when an execution time of the system-level task, which is set beforehand to correspond with a type of processing content of the system-level task, elapses after the task processing unit has started the task of the external program, the execution control unit terminates the processing of the system-level task performed by the task processing unit.

8. An information processing method, comprising:
processing application program tasks as user-level tasks by a processor;
issuing a conditional processing request for a system-level task of a system program that is called by the application program, where the conditional processing request includes a time limit from issuance within which the system-level task must be initiated by the processor;
incorporating the system-level task into a scheduling mechanism of the user-level tasks, such that the scheduling mechanism determines an execution order of the user-level tasks and the system-level task within the processor;
determining whether or not the processor initiates the system-level task within the time limit; and
forcing the processor to execute the system-level task irrespective of the scheduling mechanism when the determination indicates that the processor has not initiated the system-level task within the time limit, wherein:
the step of incorporating the system-level task into the scheduling mechanism of user-level tasks includes storing the user-level tasks to be processed in a user-level task queue in memory,
the step of issuing the conditional processing request includes: (i) converting a data format of the system-level task into a data format of the user-level tasks, and (ii) inserting the system-level task having the data format converted into the data format of the user-level tasks amongst the user-level tasks within the user-level task queue,
the step of processing application program tasks includes selecting and processing the system-level task from among the tasks stored in the task queue in a same manner as the user-level tasks, and
the step of converting the data format of the system-level task to the data format of the user-level tasks includes adding at least one of: (i) a priority level to the system-level task, and (ii) a number of task processing units assignable to process the system-level task, which are set by the application program that calls the system-level task.

9. The information processing method according to claim 8, wherein the step of incorporating includes converting a data format of the system-level task into a data format of the user-level tasks.

10. A non-transitory, computer-readable medium containing a program, the program comprising:
a task processing module operative to process application program tasks as user-level tasks;
an issuing module operative to issue a conditional processing request for a system-level task of a system program that is called by the application program, where the conditional processing request includes a time limit from issuance within which the system-level task must be initiated by the task processing module;
an incorporating module operative to incorporate the system-level task into a scheduling mechanism of the user-level tasks, such that the scheduling mechanism determines an execution order of the user-level tasks and the system-level task within the task processing module;
a determining module operative to determine whether or not the task processing module initiates the system-level task within the time limit; and
a forcing module operative to force the task processing module to process the system-level task irrespective of the scheduling mechanism when the determination module determines that the task processing module has not initiated the system-level task within the time limit, wherein:
the scheduling mechanism of user-level tasks includes the incorporating module storing the user-level tasks to be processed in a user-level task queue in memory,
when the issuing module issues the conditional processing request for the system-level task, the task allocation unit: (i) converts a data format of the system-level task into a data format of the user-level tasks, and (ii) inserts the system-level task having the data format converted into the data format of the user-level tasks amongst the user-level tasks within the user-level task queue,
the task processing module selects and processes the system-level task from among the tasks stored in the task queue in a same manner as the user-level tasks, and
the conversion of the data format of the system-level task to the data format of the user-level tasks includes adding at least one of: (i) a priority level to the system-level task, and (ii) a number of task processing units assignable to process the system-level task, which are set by the application program that calls the system-level task.

* * * * *